H. H. HARRIS.
TRUCK STEERING MECHANISM.
APPLICATION FILED APR. 16, 1913.

1,083,681.

Patented Jan. 6, 1914.
2 SHEETS—SHEET 1.

H. H. HARRIS.
TRUCK STEERING MECHANISM.
APPLICATION FILED APR. 16, 1913.

1,083,681.

Patented Jan. 6, 1914.
2 SHEETS—SHEET 2.

Witnesses
O. M. Kappler
Justus W. Machlin

Inventor
Hollis H. Harris,
by Albert O. L. Bake,
Attorney

UNITED STATES PATENT OFFICE.

HOLLIS H. HARRIS, OF LORAIN, OHIO, ASSIGNOR TO THE THEW AUTOMATIC SHOVEL COMPANY, OF LORAIN, OHIO, A CORPORATION OF OHIO.

TRUCK-STEERING MECHANISM.

1,083,681.   Specification of Letters Patent.   Patented Jan. 6, 1914.

Application filed April 16, 1913  Serial No. 761,547.

*To all whom it may concern:*

Be it known that I, HOLLIS H. HARRIS, a citizen of the United States, residing at Lorain, in the county of Lorain and State of Ohio, have invented a certain new and useful Improvement in Truck-Steering Mechanism, of which the following is a full, clear, and exact description, reference being had to the accompanying drawings.

This invention relates to wheeled trucks of the type which have a steering axle and carry a swiveled superstructure, illustrations of which are the well known steam shovels, excavators, etc., adapted to travel independently of any trackway. My prior application No. 605,815, filed January 31, 1911 for truck steering mechanism shows, describes and claims such a truck combined with flexible connections between the superstructure and the steering axle, enabling the turning of the superstructure to automatically turn the axle to steer the machine.

The present invention is an improvement on that portion of the embodiment of such prior application which relates to the connection of the flexible mechanism with the superstructure, in that the present invention provides a simple and effective mechanism, easily operatable at will from the superstructure for coupling such superstructure to the flexible connecting mechanism and uncoupling it therefrom, as desired. This enables the operator in the cab of the superstructure to automatically steer the machine when it is propelled, and to throw out the connection to swing the superstructure independently without the necessity of descending from the cab.

The invention comprises the means by which this simple and effective connection is provided, as hereinafter more fully explained and as summarized in the claims.

Figure 1:
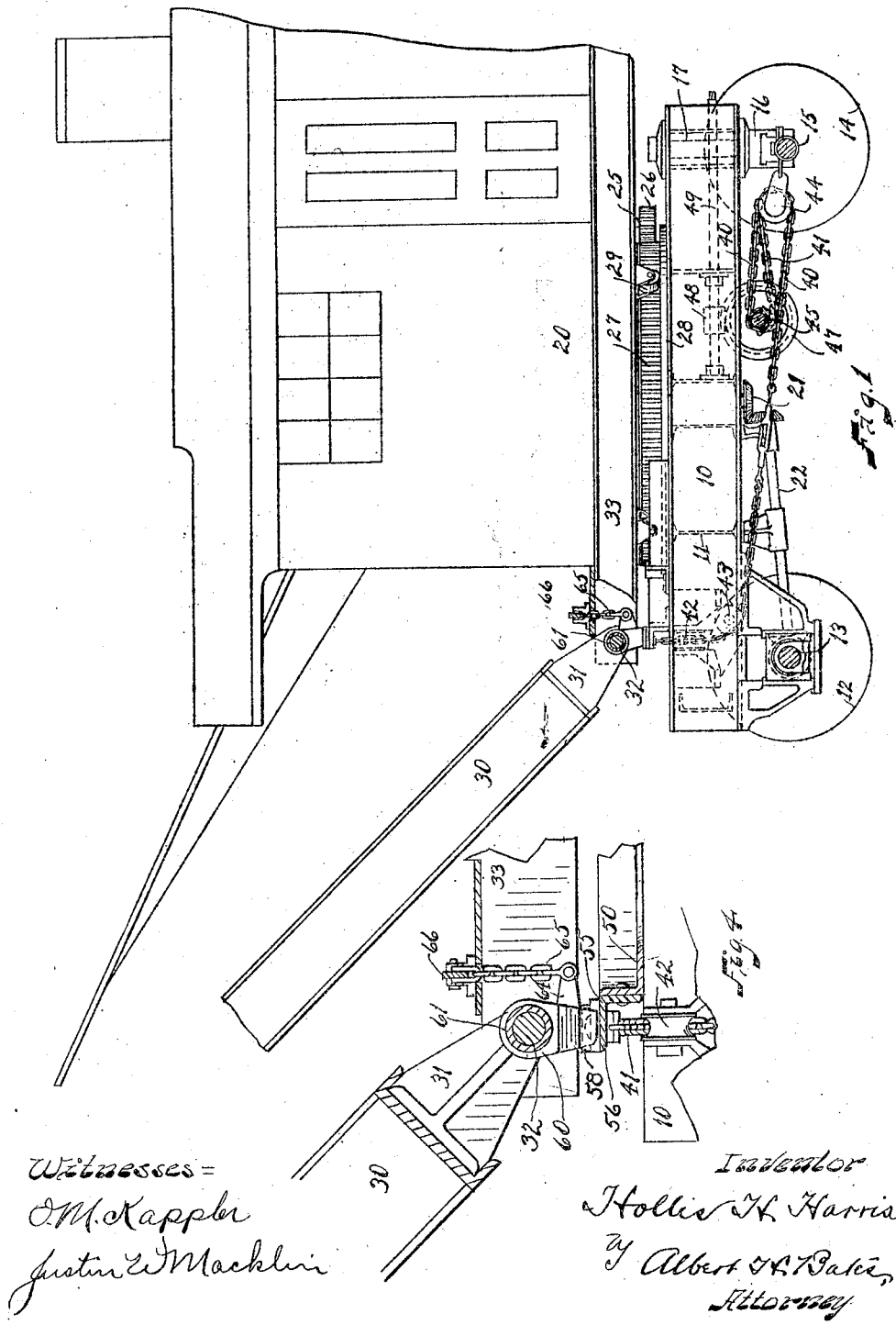
Figure 2:
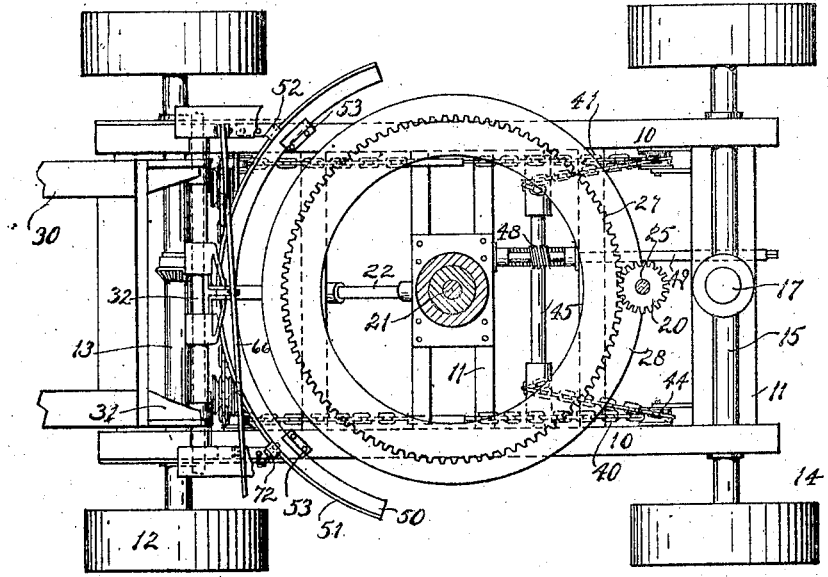
Figure 3:
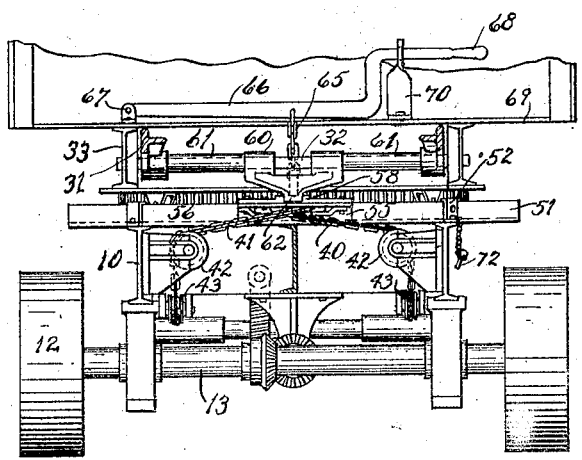

In the drawings, Figure 1 is a side elevation of a portion of the steam shovel or similar machine equipped with my invention; Fig. 2 is a sectional plan of a plane just above the truck, being sectioned through the king pin or swivel and the vertical propelling and turning shafts; Fig. 3 is a front elevation of the truck, the front cross beam of the truck frame being removed for clearness of illustration; Fig. 4 is an enlarged sectional side elevation of a portion of the mechanism adjacent to the heel of the boom illustrating the coupling mechanism of this invention.

As shown in the drawing, the truck frame consists of longitudinal beams 10 and various cross beams 11.

12 indicates the forward wheels of the truck which are mounted on an axle 13 journaled in bearings on the under sides of the beams 10.

14 indicates the rear wheels, which are mounted on an axle 15 pivoted in a block 16 which has an upward shank 17, whereby it is swiveled in the rear cross bars of the truck frame.

20 indicates the superstructure which is swiveled on the truck frame. A central vertical driving shaft 21 leads downwardly from propelling mechanism (not shown) in the superstructure through the swivel, and is connected by beveled gearing with a fore-and-aft shaft 22, which connects by bevel gearing with the axle 13. This provides for propelling the vehicle. Extending downwardly from the mechanism within the cab is a vertical shaft 25 having a pinion 26 meshing with the stationary gear 27 carried on the top of the truck. Adjacent to this gear is an annular trackway 28 on which ride wheels 29 carried by the superstructure. This construction provides for swinging the superstructure about its swivel, as desired.

The boom, indicated by 30, is suitably carried by the superstructure. As shown, its lower end is supported by brackets 31 mounted on a cross rod 32 secured between the beams 33 of the platform constituting the floor of the superstructure.

The machine described is steered by swinging the rear axle 15 on the swivel 17. I accomplish this by means of two chains 40 and 41 which lead from the anchorage near the forward end of the machine downwardly across pulleys 42 and 43 and then rearwardly over movable pulleys 44 connected with the rear axle and then around a transverse shaft 45. One of these chains, as 40, passes onto the shaft 45 from above, and the other (41) from below, so that the turning of the shaft winds in one chain and slackens on the other. The shaft is normally locked by reason of the worm wheel 47 thereon, which meshes with a worm 48 on a shaft 49.

From the construction described it will be seen that if the anchorage for the forward end of the chain is stationary, the turning of the shaft 49 (for example, by a crank on its rear end) will swing the axle 15 about the swivel 17 to steer the machine. On the other hand, if it is desired to steer the machine automatically by the turning of the boom (as claimed in my prior application referred to) the forward ends of the chains are anchored to the superstructure. The worm gear makes an automatic lock for the rear end of the chains, and accordingly, the turning of the superstructure steers the machine. As in the use of the steam shovel, the superstructure is constantly swung. When it is not desired to propel or steer the machine, it is very desirable to have a connection between the superstructure and chains which may be readily thrown into and out of action from the platform. I accomplish this in the present invention by mechanism which I will now describe.

Slidably mounted on the top of the truck bars 10 is an arcual bar 50 concentric of the turn table. This bar is shown as an angle iron having a vertical flange 51. It is slidably guided by clips 52 and 53 secured to the frame bars 10. Adjacent to the mid point of the arcual bar 50 on its forward side is secured an angle bracket 55 having a horizontal flange 56, to the under side of which is permanently secured the forward end of the chains 40 and 41. On the upper face of the flange 56 are a pair of spaced lugs 58. Rotatably mounted on the shaft 32 and held centrally by sleeves 61 on that shaft is a block 60 adapted to swing downward by gravity and have its lower end 62 stand between the lugs 58. This block thus locks the chain anchorage to the superstructure so that the turning of the superstructure may steer the vehicle, the arcual bar 50 sliding around in its guideway in such movement. The swinging of the block 60 on its axis withdraws it from between the lugs 58 and thus disconnects the chains of the superstructure. To swing the block in this way conveniently from the platform, I provide an arm 64 on the block which is connected by a vertical chain 65 with the lever 66. This lever is shown as pivoted at 67 having a handle 68 at its other end. The lever may rest upon the floor 69 of the platform when the block 60 is in locking position; then to disconnect the parts it is only necessary to raise the lever and hold it in raised position. For this purpose I may provide a suitable standard 70 having a notch in its upper end in which the lever may rest after it has been raised to swing the block 60 to disconnect the mechanism.

When the automatic steering mechanism described is disconnected by the raising of the lever 66, the locking of the arcual bar 50 to the truck frame by any suitable means anchors the chains at their forward end to the truck frame, so that the machine may be steered by hand by rotating the shaft 49. A convenient means to lock this arcual bar is a coupling pin 72 which may be passed through one of the brackets 52 into a properly positioned opening in the flange 51 of the arcual bar. This coupling pin 72 is shown in Fig. 3 as depending from a chain in idle position.

Having thus described my invention, what I claim is:

1. The combination of a truck frame, steering wheels, a platform rotatably mounted on the frame, flexible devices connected with the steering wheels, and means operated from the platform for connecting and disconnecting the flexible devices with the platform.

2. The combination of a truck frame having steering wheels, a platform rotatably mounted on the truck frame, flexible mechanism connected with the steering wheels, a device for connecting the flexible mechanism with the platform including a lever mounted on the platform for controlling such connection.

3. The combination, with a truck having steering wheels, of a platform rotatably mounted on the truck, a movable member on the truck, flexible connections between the same and the steering wheels, and means for locking said movable member at will to the platform.

4. The combination of a truck having steering wheels, a superstructure swiveled on the truck, a slidable member mounted on the truck, flexible connections between the same and the steering wheels, and means for locking said slidable member to the superstructure.

5. The combination of a truck having steering wheels, a superstructure swiveled on the truck, an arcual member slidable on the truck concentrically of the swivel, flexible members connecting the arcual member with the steering wheels, and mechanism operatable at will for connecting the arcual member with the superstructure.

6. The combination of a truck having steering wheels, a superstructure swiveled on the truck, a member slidably mounted on the truck, flexible connections between said member and the steering wheels, a locking device carried by the superstructure adapted to coact with said sliding member, and means on the superstructure for moving the locking device.

7. The combination of a truck, a superstructure swiveled thereon, an arcual member slidably mounted on the truck concentric of the swivel, a pair of flexible connections leading in opposite directions from the arcual member to a movable axle for two of the wheels, a locking device carried by the superstructure adapted to connect with the arcual member or be disconnected therefrom, and means on the superstructure for moving said locking device.

8. The combination of a wheel truck having a steering axle, a platform swiveled on the truck, an arcual bar slidably mounted on the truck concentric of the swivel, flexible connections anchored at one end to the arcual bar and connected with the axle on opposite sides of its pivot, a movable locking device carried by the platform and adapted to interlock with the arcual bar, a lever on the platform, and a connection between it and the locking device.

9. The combination of a truck having steering wheels, a platform swiveled on the truck, an arcual bar located in a horizontal plane on the truck and concentric of the swivel, said bar being slidably guided on the truck frame and having a horizontal and a vertical flange, a pair of flexible members, an anchorage for one end of said members secured to the vertical flange of the arcual bar, said flexible members passing in opposite directions from such anchorage across pulleys to a movable axle on which the steering wheels are mounted, a swinging dog carried by the platform and adapted to interlock with means secured to the vertical flange of the arcual bar, a lever on the platform, and a connection between it and the dog.

In testimony whereof, I hereunto affix my signature in the presence of two witnesses.

HOLLIS H. HARRIS.

Witnesses:
C. A. WEBER,
H. B. NEWTON.